United States Patent
Idomoto et al.

(10) Patent No.: US 7,681,909 B2
(45) Date of Patent: Mar. 23, 2010

(54) AIRBAG DEVICE

(75) Inventors: Takashi Idomoto, Ibaraki (JP); Takeshi Ohwada, Ibaraki (JP); Yutaka Tsuchida, Ibaraki (JP); Hiroya Tabushi, Ibaraki (JP); Chihiro Ito, Ibaraki (JP); Yosuke Shimizu, Ibaraki (JP); Shinobu Yamamoto, Ibaraki (JP)

(73) Assignee: Autoliv Development AB, Vargarda (SE)

( * ) Notice: Subject to any disclaimer, the term of this patent is extended or adjusted under 35 U.S.C. 154(b) by 427 days.

(21) Appl. No.: 11/705,919

(22) Filed: Feb. 13, 2007

(65) Prior Publication Data
US 2007/0200319 A1   Aug. 30, 2007

(30) Foreign Application Priority Data
Feb. 14, 2006   (JP)   .............................. 2006-036762

(51) Int. Cl.
*B60R 21/233*   (2006.01)
(52) U.S. Cl. ........................ 280/729; 280/736; 280/742; 280/732
(58) Field of Classification Search ................. 280/366, 280/742, 729, 743.1, 731, 732
See application file for complete search history.

(56) References Cited

U.S. PATENT DOCUMENTS

2003/0218325 A1   11/2003   Hasebe et al.
2006/0186648 A1*   8/2006   Bauer et al. .................. 280/729
2006/0186655 A1*   8/2006   Ehrke ....................... 280/743.1
2006/0197318 A1*   9/2006   Choi et al. ................... 280/729
2006/0279072 A1*   12/2006   Hanawa et al. .............. 280/729
2007/0145730 A1*   6/2007   Choi ........................... 280/740

FOREIGN PATENT DOCUMENTS

| JP | H11-48906 A | 2/1999 |
|---|---|---|
| JP | 2000-159045 A | 6/2000 |
| JP | 2003-335203 A | 11/2003 |

* cited by examiner

*Primary Examiner*—Ruth Ilan
(74) *Attorney, Agent, or Firm*—Harness, Dickey & Pierce, P.L.C.

(57) ABSTRACT

An airbag device according to the invention is applicable to an airbag device having an airbag that is housed in a state of being able to inflate and deploy in front of an occupant. The airbag has a center chamber positioned in the vicinity of the center on the occupant side in a deployed state, and side chambers positioned on both the left and right sides of the center chamber. Moreover the airbag is provided with a gas supply section that supplies inflation gas to inside of the side chambers, and a means for introducing inflation gas to inside of the center chamber after the side chamber. Furthermore, the side chamber has; a gas introduction space into which inflation gas from the gas supply section is introduced, an upper space that extends upward from the gas introduction space, and a lower space that extends downward from the gas introduction space.

17 Claims, 11 Drawing Sheets

(A)

(B)

(C)

(A)

(B)

(A)

(B)

(C)

(A)

(B)

(C)

AIRBAG DEVICE

CROSS REFERENCE TO RELATED APPLICATION

This application claims the priority of Application No. 2006-36762, filed Feb. 14, 2006 in Japan, the subject matter of which is incorporated herein by reference

TECHNICAL FIELD OF THE INVENTION

The present invention relates to an airbag device for a vehicle. In particular, the present invention relates to an airbag device that is disposed in front of an occupant, for example, to an airbag device that protects an occupant in a front passenger seat.

BACKGROUND OF THE INVENTION

In an airbag device, particularly in an airbag device for a driver's seat that is housed in a center section of a steering wheel, and in an airbag device for a front passenger seat that is housed in an instrument panel (dash board), quick deployment of an airbag is important. At the same time, there is a requirement to reduce damage to the head or neck of an occupant. Particularly, there is a strong demand to reduce an occupant injury value when the occupant is in unusually close proximity to the steering wheel or instrument panel (out of position).

In the invention disclosed in Japanese Unexamined Patent Publication No. 2003-335203, two airbags positioned on left and right sides of an occupant are provided, and these two airbags are linked by a tie panel in an occupant side end section.

However, in the invention disclosed in Japanese Unexamined Patent Publication No. 2003-335203, it was possible for the tie panel to come in forceful contact with the head or neck of the occupant when the airbag inflates and deploys, resulting in aggravation of any neck injury of the occupant. Such a problem occurs not only when the occupant is in unusually close proximity to the steering wheel or instrument panel (out of position) but may also occur even when the occupant is in a normal sitting position.

Moreover, the invention disclosed in Japanese Unexamined Patent Publication No. H 11-48906 employs a construction in which an airbag is divided into three spaces. However, in this invention, the design of the panel (fabric) and the gas flow channel become complex accompanying the increased complexity of the structure. As a result, there is a disadvantage such as an increase in production cost. Furthermore, carrying out precise and reliable deployment control for each space was difficult.

In the invention disclosed in Japanese Unexamined Patent Publication No. 2000-159045, an airbag is divided into two spaces in the front and rear to adjust a front projecting distance of the airbag when deployed. However, the problem of occupant restraint capacity remains.

OBJECTS OF THE INVENTION

In consideration of the circumstances mentioned above, an object of the present invention is to provide an airbag device that can reliably reduce a neck injury value without loss of occupant restraining performance when an occupant is in unusually close proximity (out of position) and in a normally sitting position.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims

SUMMARY OF THE INVENTION

In order to achieve the above object, an airbag device according to the present invention is an airbag device having an airbag that is housed in a state of being able to inflate and deploy in front of an occupant, wherein the airbag has a center chamber positioned in the vicinity of the center on the occupant side in a deployed state, and side chambers positioned on both the left and right sides of the center chamber. It is provided with a gas supply section that supplies inflation gas to inside of the side chambers, and a means for introducing inflation gas to inside of the center chamber after the side chamber. In other words, the inflation gas is guided first to the side chambers, then to the center chamber. The side chamber has; a gas introduction space into which inflation gas from the gas supply section is introduced, an upper space that branches from the gas introduction space and extends upward, and a lower space that branches from the gas introduction space and extends downward.

In the present invention, the shape of the space that regulates an inner zone of the side chamber is important. By forming a plurality of spaces that extend in a radial pattern from an inflator toward the occupant side, the shape of the entire airbag is stabilized early.

Here, the "gas introduction space" may be a minimal space present only in close proximity to the inflator. The side chambers on both the left and right sides may have structures that, when seen from their respective side faces, are branched from the gas introduction space in an elbow shape or a letter C-shape and that form the upper space and the lower space. Furthermore, the tip end side of the elbow shape or letter C-shape of the upper space and the lower space may be inflected inward. The degree of inflection is not particularly limited. However, it is preferable that the tip end extend vertically so as not to interfere with a quick deployment. Moreover, number of spaces that are branched from the gas introduction space, and deploy toward the occupant side is not necessarily limited to two, and, for example, another space (third space) may be formed to extend from the gas introduction space toward the occupant side in the proximity the center of where the gas introduction space branches in an elbow shape or C-shape.

According to the airbag device according to the present invention having such a configuration, the side chambers deploy first and the center chamber deploys afterward, and neck injury value can be reduced without impairing its occupant restraining performance even when the occupant is in unusually close proximity to the instrument panel or the like. That is to say, after vehicle collision, only the side chambers deploy and restrain the occupant immediately. However, as the center chamber has not fully deployed, the internal pressure is low so that the impact of the airbag on the head and neck of the occupant can be reduced. By the inflation and deployment of the upper space of the side chamber, the occupant can be prevented from colliding with the windshield, or from breaking through the windshield and being thrown out of the vehicle. Meanwhile, by the inflation and deployment of the lower space of the side chambers, the impact of the occupant colliding into the instrument panel can be lessened. Even when the occupant in the vehicle is in a normal sitting position, sufficient restraining performance can be achieved.

By providing the upper space and the lower space in the side chambers on the left and right sides, a tensile force acts towards the four corner directions (radial direction) of the airbag when deployed, so that the shape of the airbag can be stabilized at an early stage. As a result, the occupant can be quickly restrained within the vehicle.

By forming the gas introduction space, the upper space, and the lower space of the side chambers by sewing, structural simplification can be achieved.

By forming an end section on an opposite side of the gas introduction space, of the lower space of the side chamber into an upward hook shape, and forming on the tip thereof an aperture section that links to the center chamber, the deployment timing of the center chamber can be further delayed only by changing sewing lines for example.

In the side chamber, by making an area of a gas passage from the gas introduction space to the upper space greater than an area of a gas passage from the gas introduction space to the lower space, the upper space can be deployed before the lower space.

In the case where a separate inflator is provided as a means for introducing gas into the center chamber, in addition to the inflator that supplies inflation gas to the side chambers, airbag deployment speed and internal pressure of each section can be optimally set for each chamber. For example, in the case where the occupant is in unusually close proximity to the instrument panel, by lowering deployment speed of the center chamber, and by not deploying the chamber or lowering the internal pressure thereof, the impact on the head (neck) of the occupant can be lessened. Meanwhile, when the occupant is in a normal sitting position, by deploying all of the chambers, or setting the internal pressure of the chambers higher, occupant restraining performance can be maintained at a high level. Furthermore, the deployment of a plurality of chambers can be controlled according to whether or not the occupant is wearing a seat belt. In addition, the internal pressure and the operative/non-operative status of each of the chambers that form the airbag may be changed by manual setting by the occupant. For example, in the case where a child is in the front passenger seat, the center chamber may be set in an "always non-operative" state.

By configuring the airbag from: a front face panel that forms a surface on an occupant side of the center chamber; a first rear panel that forms an outer circumferential surface of the side chamber; and a second rear panel having an outer shape substantially the same as that of the first rear panel; and by making the airbag of a configuration in which the side chamber is formed by joining outer circumferences of the first rear panel and the second rear panel, and the center chamber is formed by the second rear panel and the center panel, an increase in material cost and production cost can be suppressed.

EXPLANATION OF THE REFERENCE SYMBOLS

Figure 1:
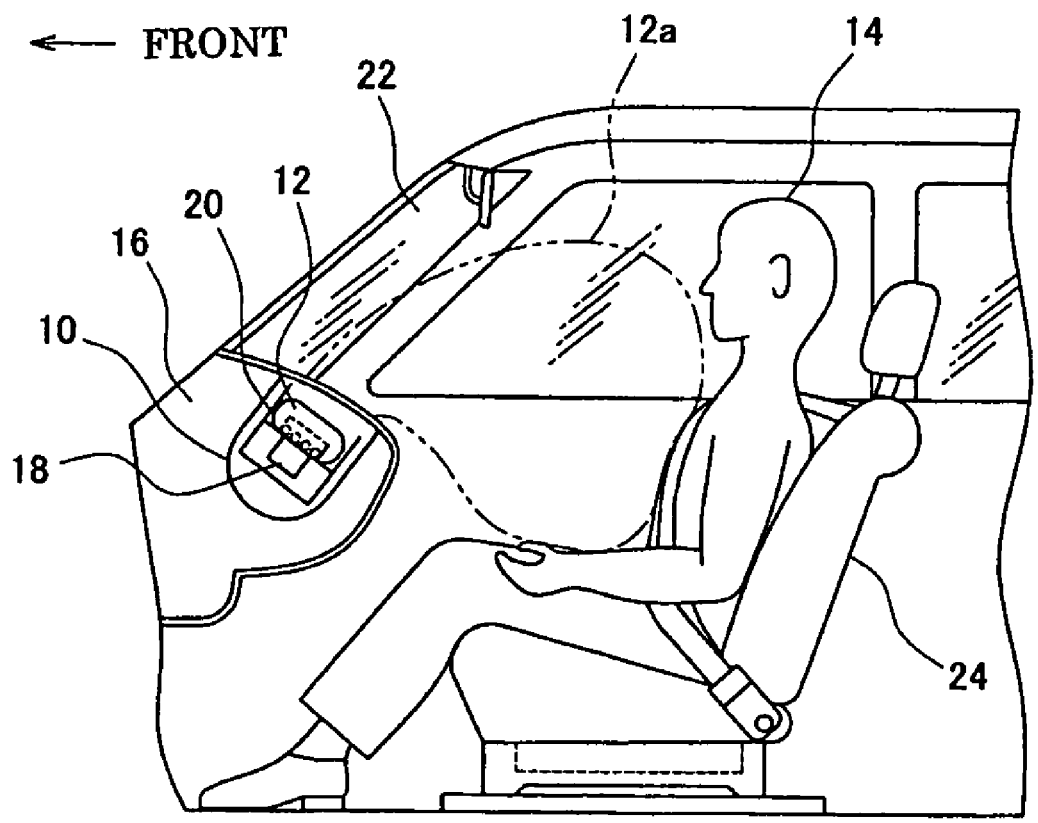
FIG. 1 is an explanatory diagram that shows an operation status of an airbag device of the present invention.

10: Airbag device
12: Airbag
12a, 112a: Airbag (deployed state)
14: Occupant
16: Instrument panel
18: Inflator
22: Windshield
102: Gas introduction space
104: Upper space
106: Lower space
114: Center chamber
116R, 116L: Side chamber
122B, 122F: Back panel
128R, 128L: Inner vent
130: Front panel

DETAILED DISCLOSURE OF THE INVENTION

In the following detailed description of the preferred embodiments, reference is made to the accompanying drawings which form a part hereof, and in which is shown by way of illustration specific preferred embodiments in which the inventions may be practiced. These preferred embodiments are described in sufficient detail to enable those skilled in the art to practice the invention, and it is to be understood that other preferred embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

FIG. 1 is an explanatory diagram that shows an operation status of an airbag device to which the present invention can be applied. An airbag device 10 according to the present invention is provided with an airbag 12 housed in a housing 20 in a state allowing inflation and deployment, and an inflator 18 that generates inflation gas. The airbag device 10 is, for example, disposed inside an instrument panel 16, and restrains an occupant 14 in a front passenger seat. The present invention can also be applied to an airbag device for a driver seat installed within a steering wheel. Furthermore it can also be applied to a case that is housed in a rear surface of a front seat, to protect an occupant in a rear seat. In the diagram, reference symbol 12a denotes an airbag in a deployed state, reference symbol 22 denotes a windshield, and reference symbol 24 denotes a front passenger seat.

Figure 2:
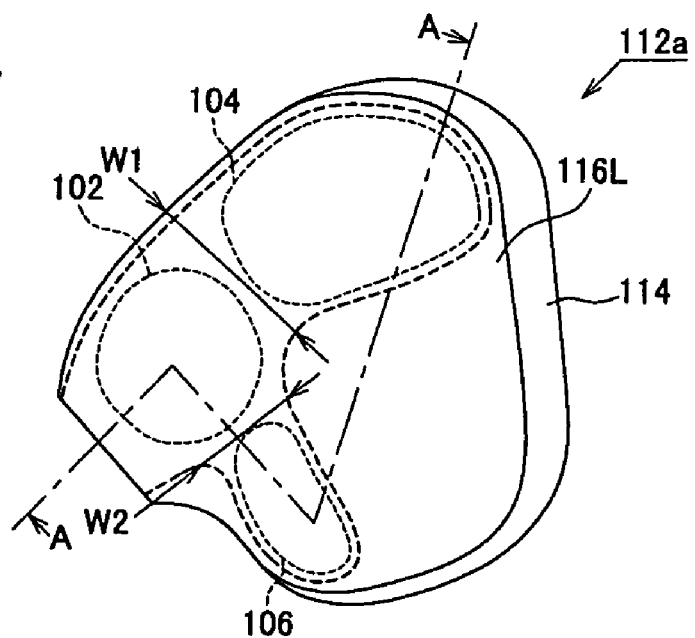
FIG. 2 is; a side view (A), a front view (B), and a rear view (C) that show a deployed state of an airbag device according to a first example of the present invention.
Figure 2:
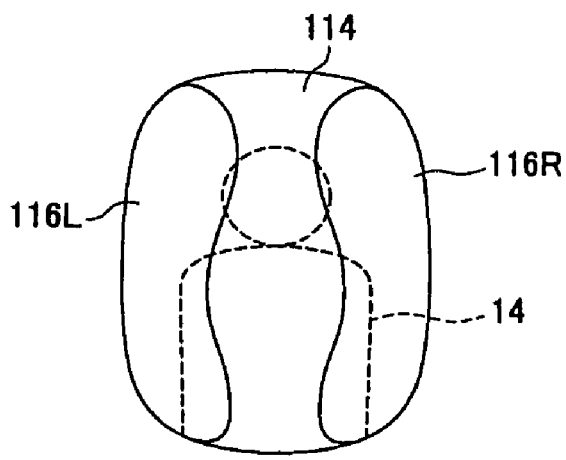
Figure 2:
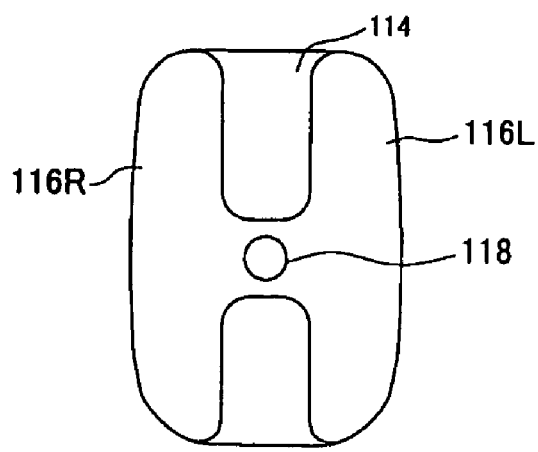
Figure 3:
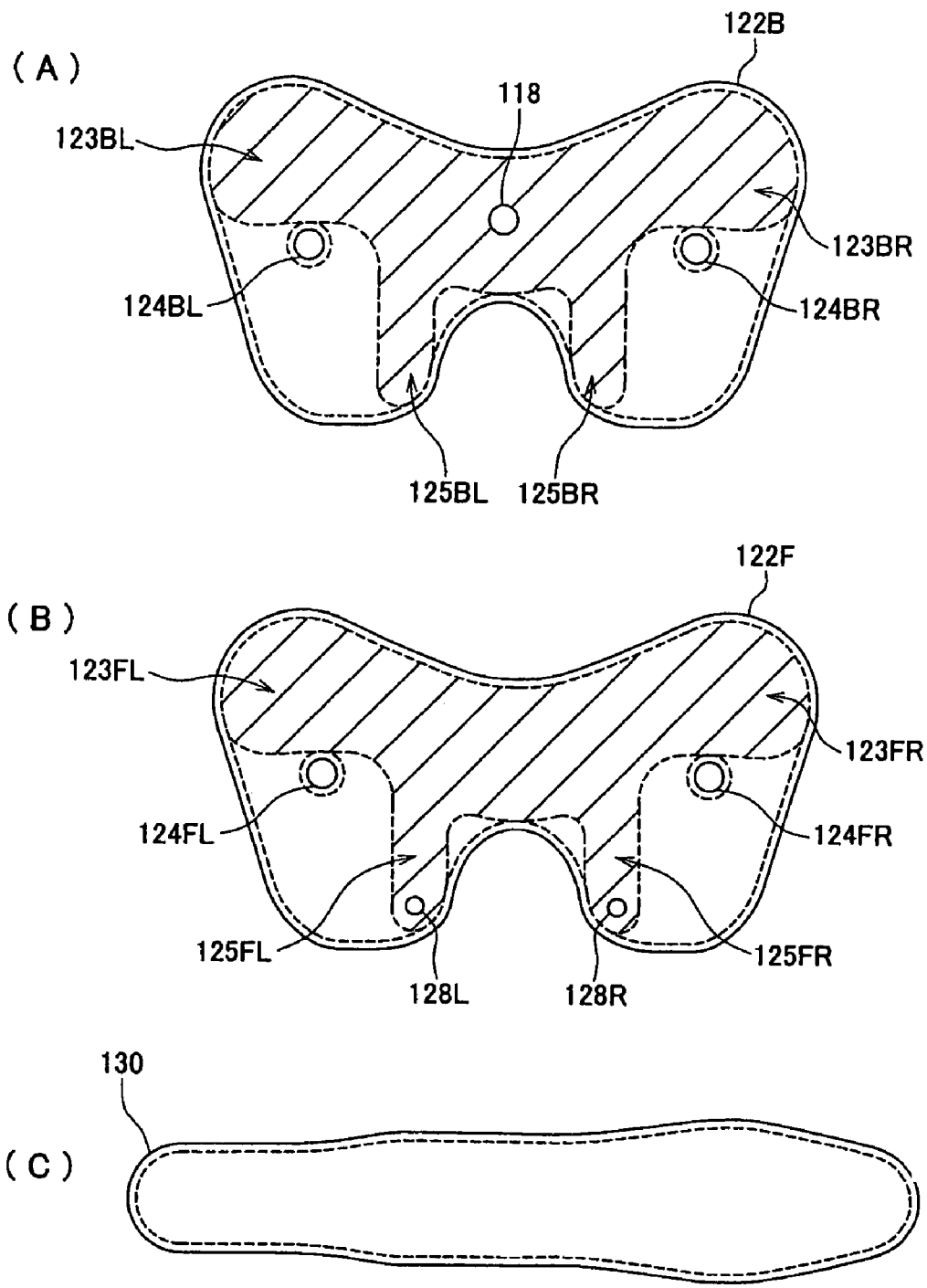
FIG. 3 is a plan view that shows a structure of the fabric panels (sheets) that form an airbag of the airbag device according to the first example, wherein (A) and (B) show a back panel, and (C) shows a front panel.
Figure 4:
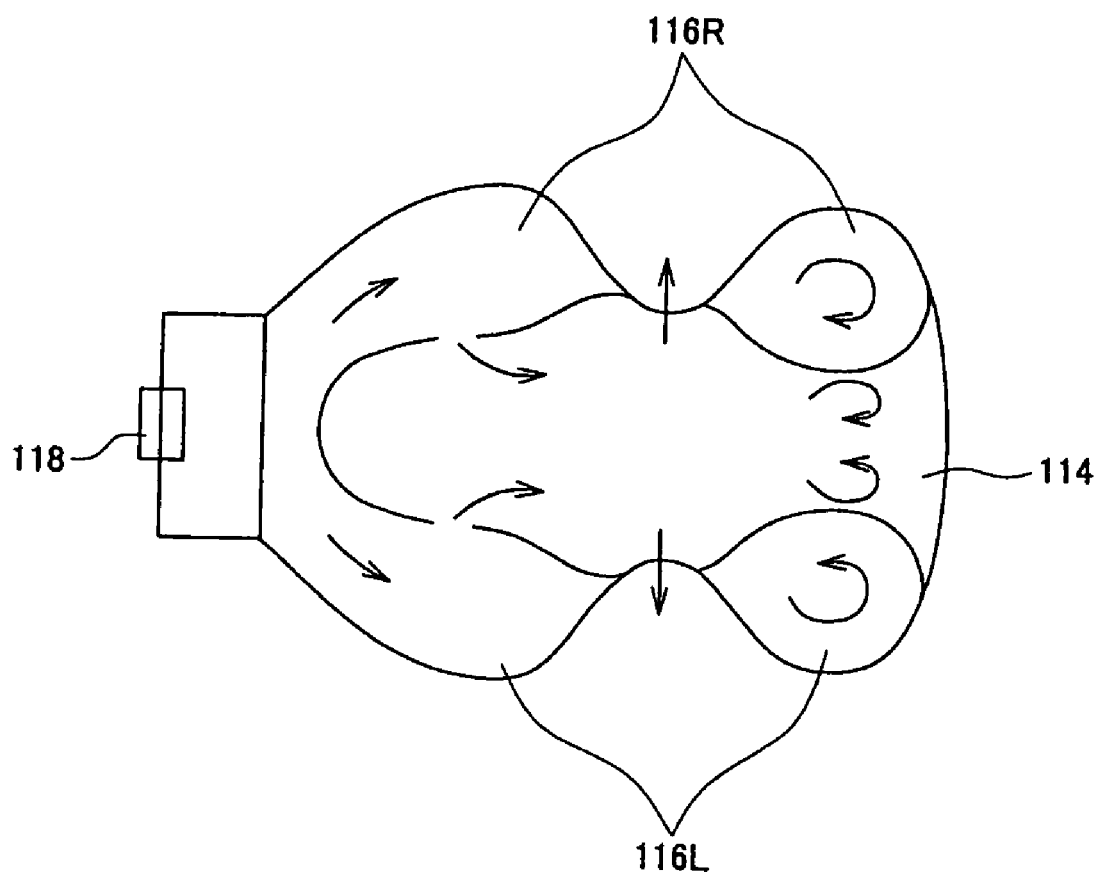
FIG. 4 is a sectional view in the A-A direction of FIG. 2 (A), being an explanatory diagram that shows a flow of inflation gas inside the airbag.

FIG. 2 is; a side view (A), a front view (B), and a rear view (C) that show a deployed state of an airbag 112a of an airbag device according to a first example of the present invention. FIG. 3 is a plan view that shows a structure of fabric panels (sheets) that form the airbag 112a; wherein (A) shows a back panel disposed outside; (B) shows a back panel disposed inside; and (C) shows a front panel. FIG. 4 is a sectional view in the A-A direction of FIG. 2 (A), showing a flow of inflation gas inside the airbag.

As shown in FIG. 2 (B), when seen as a space, the airbag 112a in a deployed state is constructed from a center chamber 114 positioned substantially in front of the occupant 14, and side chambers 116L and 116R positioned on both of the left and right sides of the center chamber 114. In FIG. 2 (A), the front chamber 114 is in a state of being almost hidden by the side chamber. The side chambers 116R and 116L are spatially a single chamber linked at the rear. Moreover, as shown in FIG. 2 (A), the side chambers 116R and 116L are provided with: a gas introduction space 102 into which inflation gas supplied from the inflator 18 is first supplied; an upper space 104 that extends diagonally upward (toward the front) from the gas introduction space 102; and a lower space 106 that extends downward from the gas introduction space 102.

The gas introduction space 102, the upper space 104, and the lower space 106 are formed (partitioned) by sewing. In the side chamber, the upper space 104 deploys from the gas introduction space 102 substantially along the windshield 22. Meanwhile, the lower space 106 deploys so as to extend downward along the instrument panel 16. An area (width) W1 of a portion that links from the gas introduction space 102 to the upper space 104 is set greater than an area (width) W2 of a portion that links from the gas introduction space 102 to the lower space 106. As a result, the upper space 104 deploys before the lower space 106 does. A gas inlet 118 that links to the inflator 18 is formed in a rear end section of the back panel that constructs the side chambers 116R and 116L.

A direction (angle) in which the upper space 104 and the lower space 106 extend, can be appropriately changed in design to suit the structure of a vehicle in which the present invention is to be applied. For example, an angle between a straight line from the gas inlet 118 to the furthest portion of the upper space 104, and a straight line from the gas inlet 118 to the furthest portion of the lower space 106 is greater than or equal to 90 degrees. Moreover, as shown in FIG. 2 (A), when the side chamber is seen from the side, considering a circumscribing circle of the side chamber 116 in its deployed state, a preferable structure is one where the upper space 104 and the lower space 106 at least reach the point where they are in contact with the circumscribing circle. Accordingly, an outline shape of the side chamber can be reliably and effectively maintained.

When seeing the airbag 112 as a panel configuration, as shown in FIG. 3, it is configured from two back panels 122B and 122F having the same shape, and a front panel 130. A band shaped front panel 130 forms an occupant side surface of the center chamber 114. The side chambers 116R and 116L are formed by sewing the outer peripheries of the two back panels 122B and 122F. Moreover, the inner back panel 122F and the center panel 130 form the center chamber 114. In FIG. 3, broken lines show the places sewed. Also, the areas shown with cross hatching in (A) and (B) are the portions that inflate as an airbag (side chamber). Inflation gas is not filled in other areas.

Sewing lines of the two back panels 122B and 122F are formed in the area of the entire circumference as well as in positions that separate (regulate) the above mentioned gas introduction space 102, the upper space 104, and the lower space 106. The gas inlet 118 that links to the inflator 18 is formed substantially in the center of the back panel 122B positioned on the rear side (outside). Moreover, vent holes 124BR and 124BL for discharging the gas inside the center chamber 114 to the outside, are formed on both of the left and right sides. Vent holes 124FL and 124FR that oppose the vent holes 124BL and 124BR of the back panel 122B, are formed in the other back panel 122F on the front side (inside). The peripheries of two opposing holes are sewn so that inflation gas inside the center chamber 114 can be discharged to the outside through the side chambers 116L and 116R.

In the inner back panel 122F, inner vents 128L and 128R are formed in the vicinity of the tip ends of areas 125FL and 125FR that form the lower space 106. These inner vents 128L and 128R are formed smaller than the vent holes 124FL and 124FR. The inner vents 128L and 128R guide the inflation gas filled inside the side chambers 116L and 116R to the center chamber 114. It is preferable to appropriately change the size and formation position of the inner vent to suit the deployment timing of the lower space 106.

In the two back panels 122B and 122F that have been sewn together: an area 123BL and an area 123FL form the upper space 104 on the left side; an area 123BR and an area 123FR form the upper space 104 on the right side; an area 125BL and an area 125FL form the lower space 106 on the left side; and an area 125BR and an area 125FR form the lower space 106 on the right side. The back panel 122F on the front side (inside) and the front panel 130 form the center chamber 114. In practice, the front panel 130 is sewed to the back panel in a state of having been rotated 90 degrees to the left from the state shown in (C) in the diagram.

When manufacturing the airbag, the two back panels 122B and 122F are overlapped first, and the peripheries of the vent holes 124BR and 124FR and peripheries of the vent holes 124BL and 124FL are respectively sewn. Then, the overlapped back panels 122B and 122F are folded from the center to the inside, and the peripheries of the back panels 122B and 122F and periphery of the front panel 130 are sewn together. The peripheries of the back panels 122B and 122F may be pre-sewn before sewing them to the front panel 130.

As shown in FIG. 4, inflation gas outputted from the inflator 18 flows first from the gas introduction space 102 of the side chambers 116R and 116L into the upper space 104 and the lower space 106. Having reached the tip end of the lower space 106, the inflation gas flows into the inside of the center chamber 114 through the inner vents 128L and 128R. Having flowed into the center chamber 114 the inflation gas is discharged from the vent holes (124BL+124FL) and (124BR+124FR) to the outside.

Figure 5:
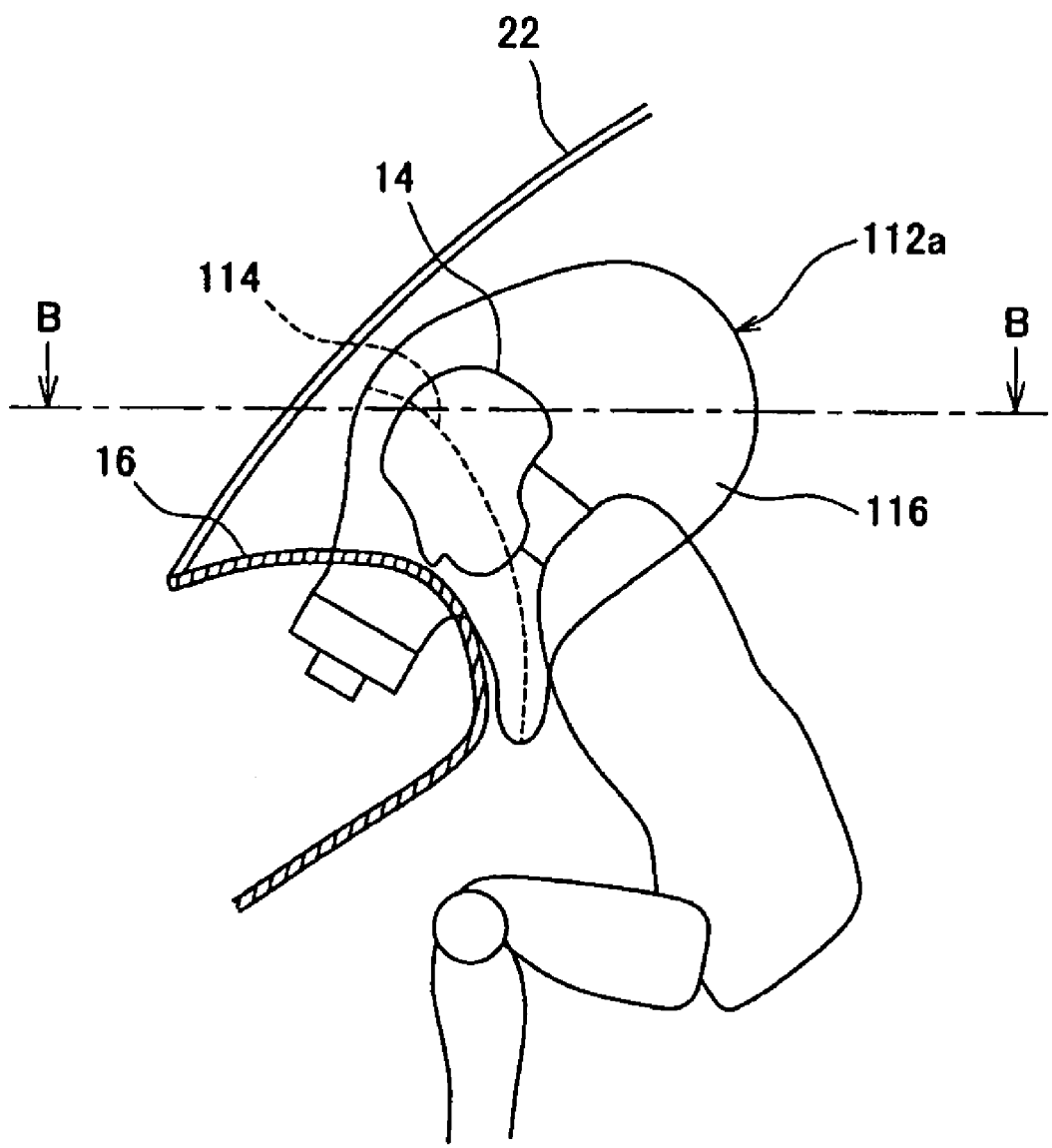
FIG. 5 is an explanatory diagram (side view) that shows a deployed state of the airbag according to the first example, showing a first stage.
Figure 6:
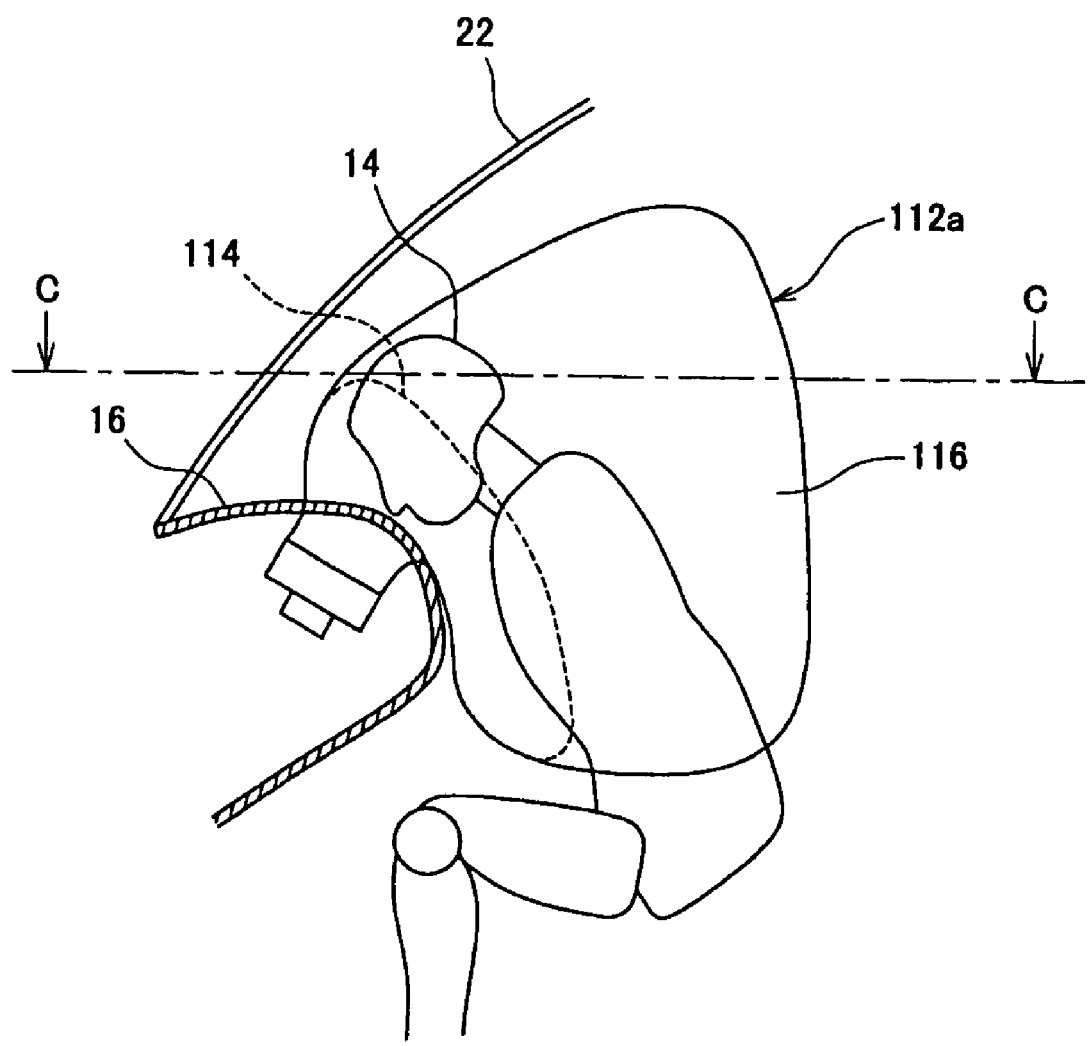
FIG. 6 is an explanatory diagram (side view) that shows a deployed state of the airbag according to the first example, showing a second stage.
Figure 7:
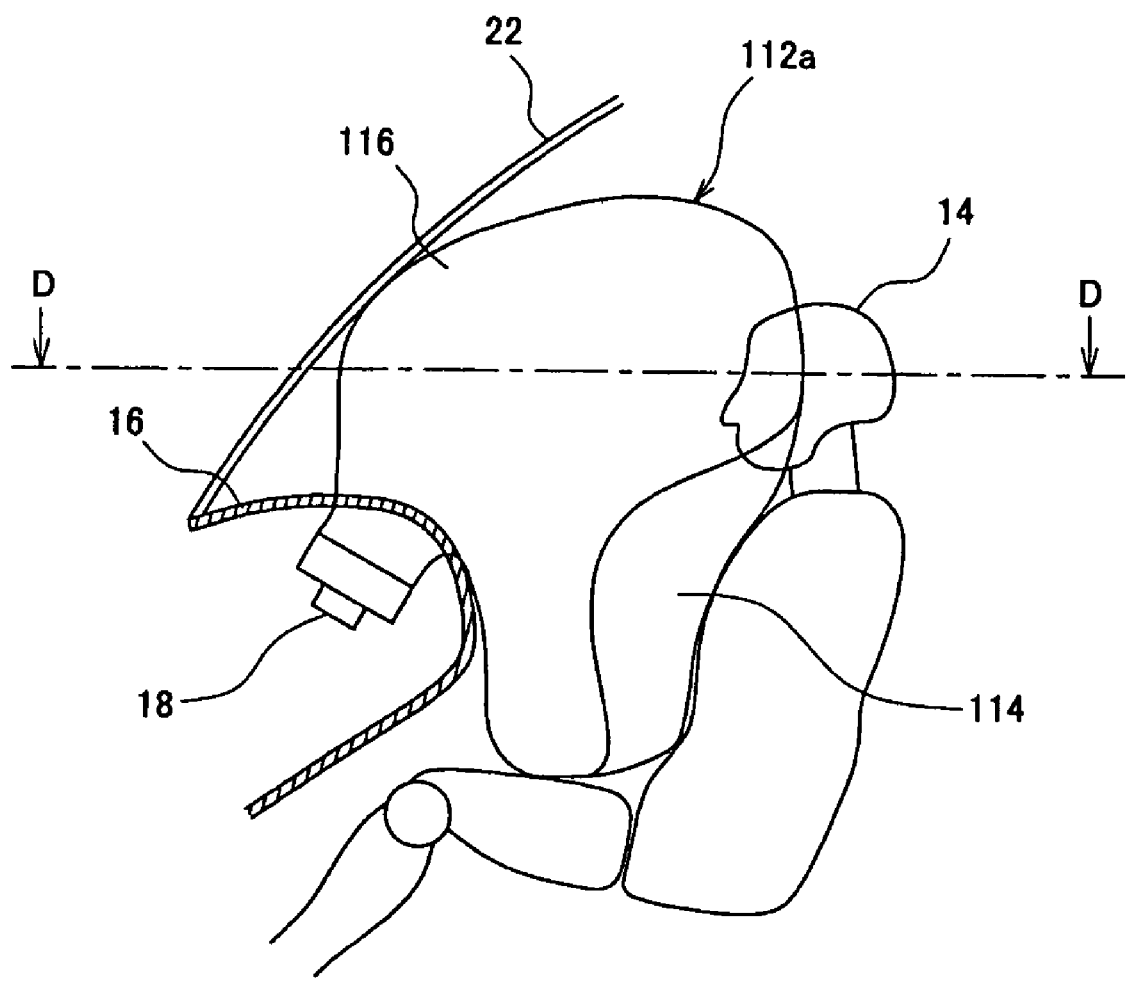
FIG. 7 is an explanatory diagram (side view) that shows a deployed state of the airbag according to the first example, showing a third stage.
Figure 8:
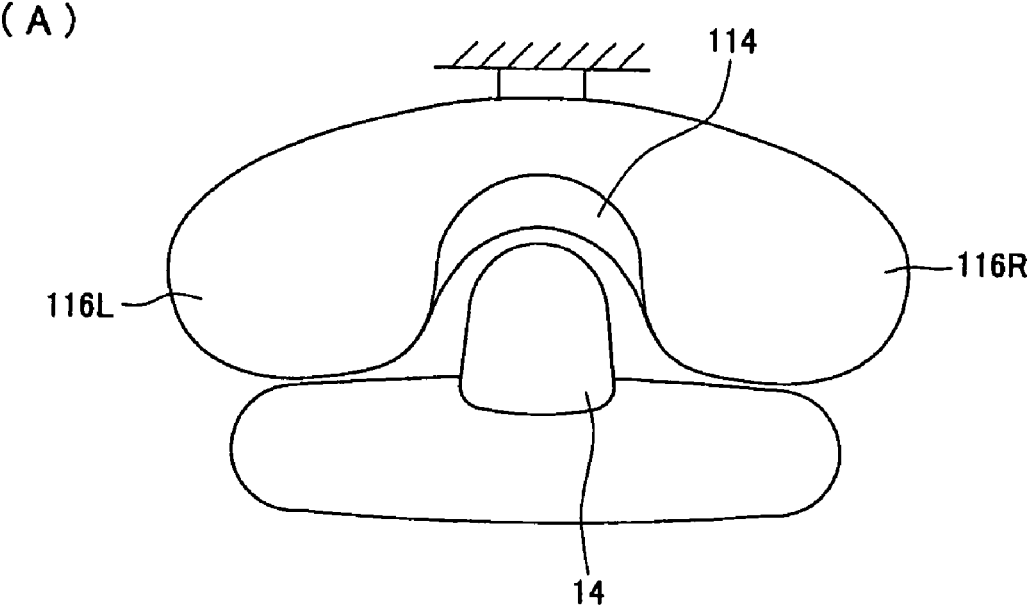
FIG. 8 (A) is a sectional view in the B-B direction of FIG. 5, and in the C-C direction of FIG. 6, and FIG. 8 (B) is a sectional view in the D-D direction of FIG. 7.
Figure 8:
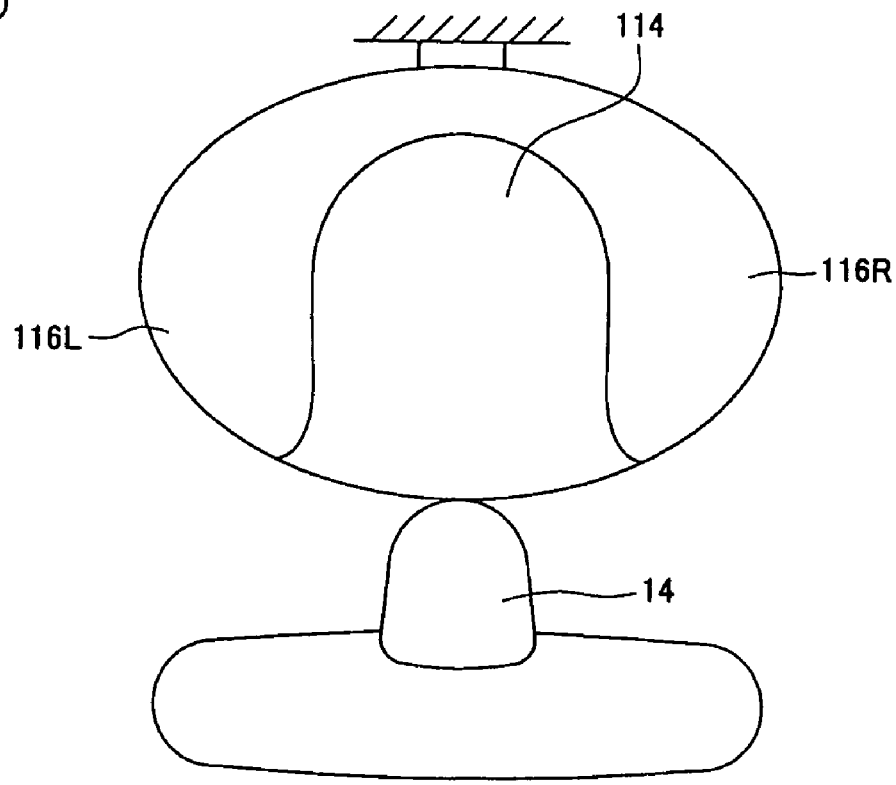
Figure 9:
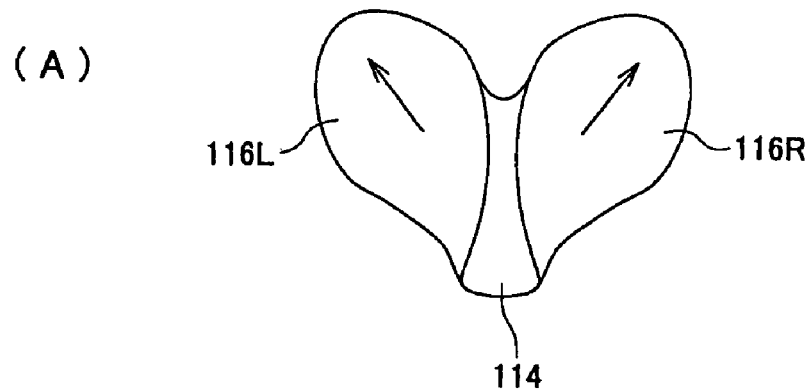
FIG. 9 is an explanatory diagram (front view) that shows a deployed state of the airbag according to the first example, wherein (A) shows the first stage, (B) shows the second stage, and (C) shows the third stage.
Figure 9:
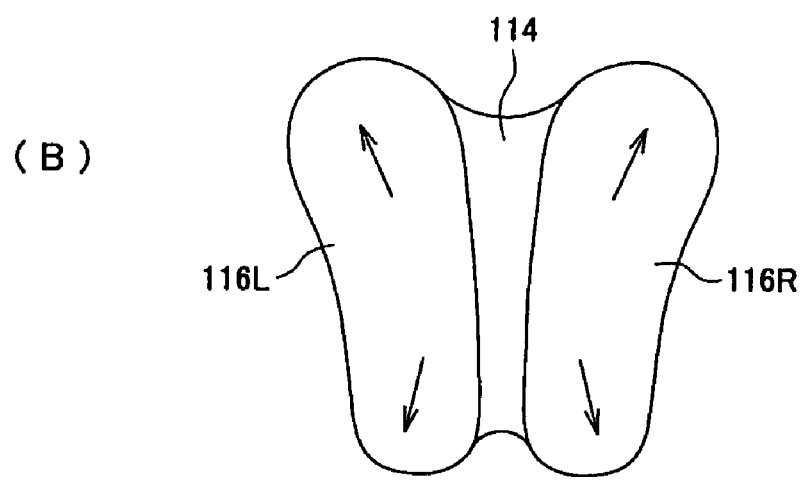
Figure 9:
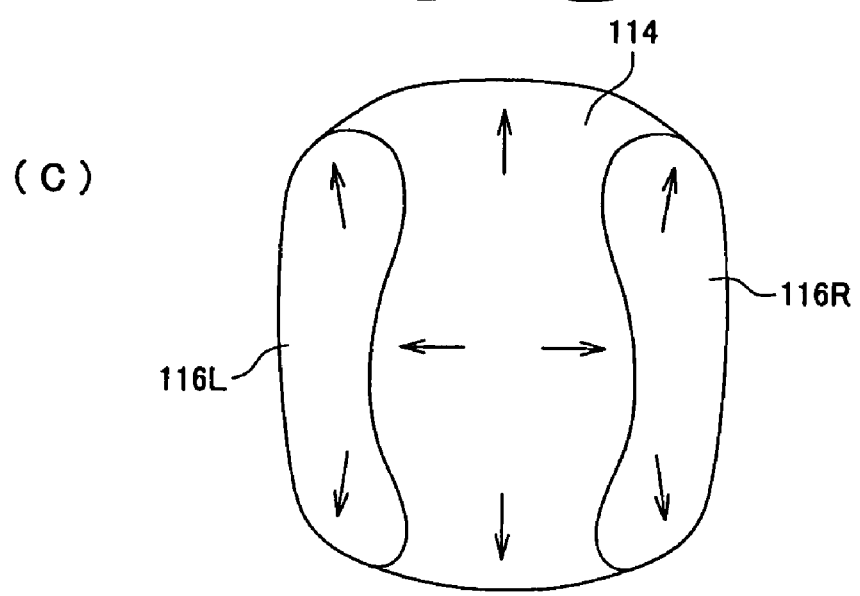

FIG. 5 through FIG. 7 are explanatory diagrams that show deployed states of the airbag 112a according to the first example. FIG. 8 is an explanatory diagram (top view) that shows a deployed state of the airbag 112a according to the first example, wherein (A) corresponds to a sectional view in the B-B direction of FIG. 5, and a sectional view in the C-C direction of FIG. 6, and (B) corresponds to a sectional view in the D-D direction of FIG. 7. FIG. 9 is an explanatory diagram (front view) that shows a deployed state of the airbag 112a according to the first example. Here, the behavior of the airbag in the case where the occupant 14 is in unusually close proximity to the instrument panel 16 is described. Even in the case where the occupant 14 is sitting normally, inflation and deployment of the airbag show the same behavior.

When a situation such as a frontal crash occurs, the inflator 18 operates and inflation gas is supplied into the inside of the airbag. First, as shown in FIG. 5, FIG. 8 (A) and FIG. 9 (A), inflation gas flows into the upper space 104 of the side chamber 116, and the side chamber inflates and deploys along the windshield 22. At this time, as shown with arrows in FIG. 9 (A), a tensile force occurs, in a substantially inverted triangle shape when seen from the occupant 14 side, toward the left and right upper corner sections of the airbag 112a. Thus, the upper body of the occupant 14, including their head, is restrained at the very first, and is protected from colliding with the windshield 22 and from being thrown out of the vehicle.

Next, as shown in FIG. 6 and FIG. 9 (B), inflation gas flows into the lower space 106 of the side chamber 116 and the side chamber inflates and deploys along the instrument panel 16. At this time, as shown with arrows in FIG. 9 (B), a tensile force occurs, in a substantially rectangular shape when seen from the occupant 14 side, from the inflator 18 toward the four front corners of the airbag 112a, and the entire shape of the airbag 112a stabilizes at the early stage so that the occupant 14 can be reliably restrained within the vehicle. In this state, the center chamber 114 is hardly deployed, so that impact of the center chamber 114 on the head and neck of the occupant 14 can be lessened.

Next, the gas filled into the lower space 106 is guided from the inner vents 128L and 128R into the inside of the center chamber 114, and, as shown in FIG. 7, FIG. 8 (B) and FIG. 9 (C), the center chamber 114 inflates and deploys after the side chamber 116. Thus, sufficient occupant restraining performance can be achieved even when the occupant 14 is in the normal sitting position.

As described above, by deploying the side chamber 116 at the early stage when the airbag is deployed, and quickly stabilizing the entire shape of the airbag, sufficient occupant restraining performance can be obtained. Also, by deploying the center chamber 114 after the side chamber 116, an injury value of the head and neck of the occupant can be reduced.

Figure 10:
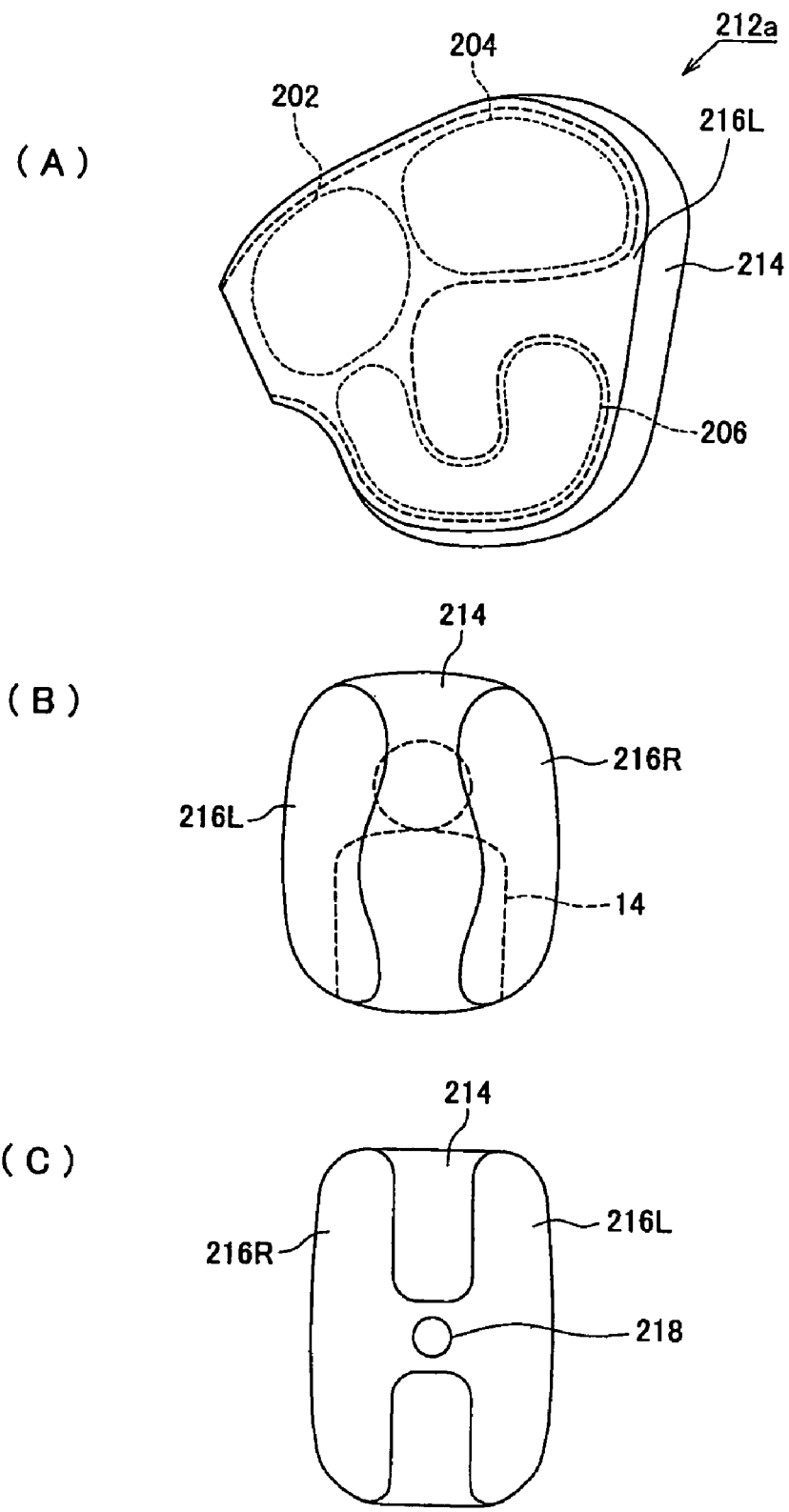
FIG. 10 is; a side view (A), a front view (B), and a rear view (C) that show a deployed state of an airbag device according to a second example of the present invention.
Figure 11:
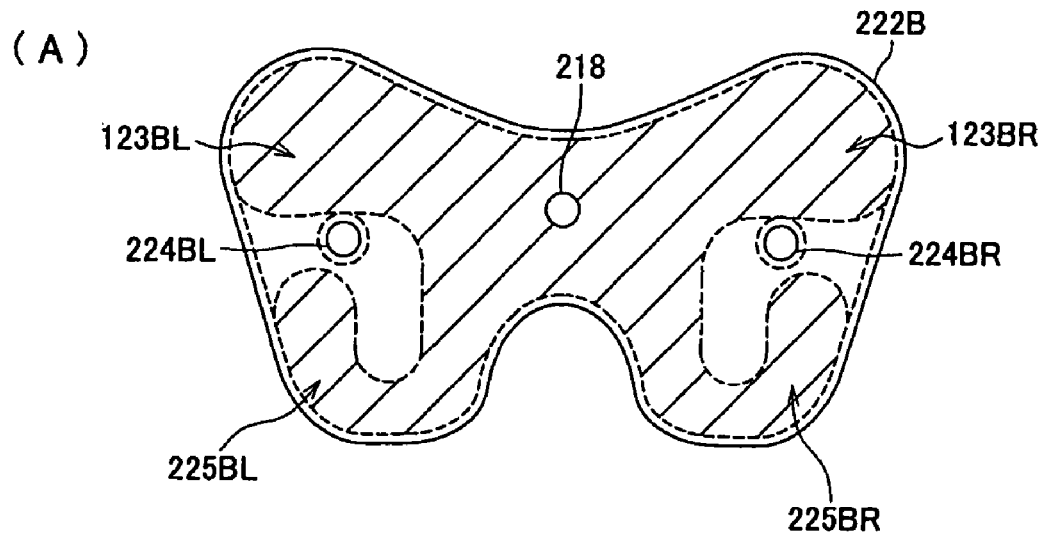
FIG. 11 is a plan view that shows a structure of the fabric panels (sheets) that form an airbag of the airbag device according to the second example, wherein (A) and (B) show a back panel, and (C) shows a front panel.
Figure 11:
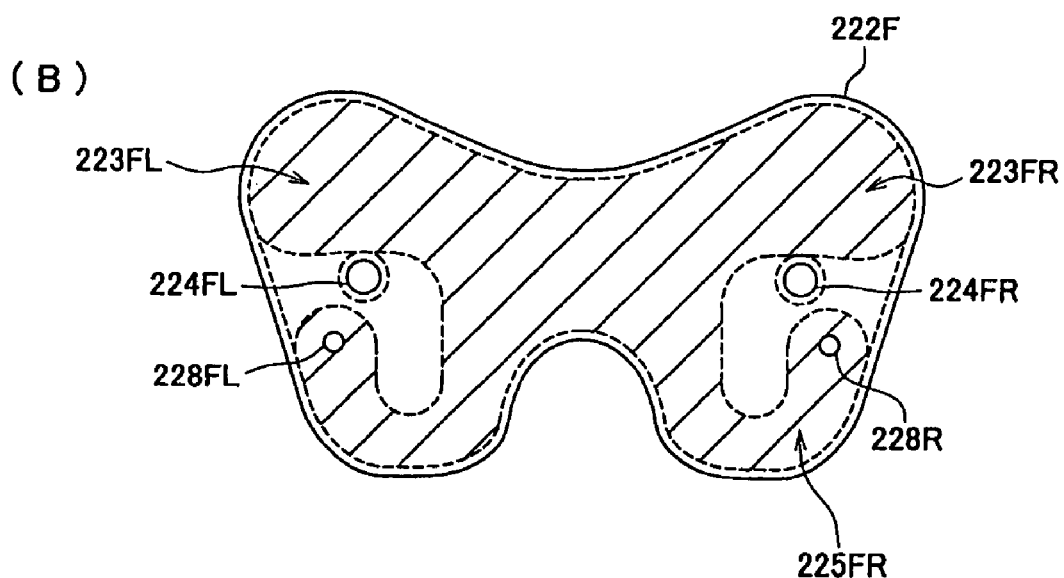
Figure 11:
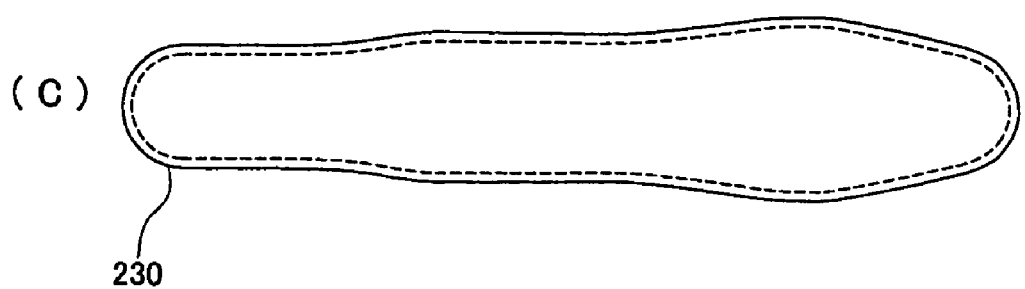

FIG. 10 is; a side view (A), a front view (B), and a rear view (C) that show a deployed state of an airbag 212a of an airbag device according to a second example of the present invention. FIG. 11 is a plan view that shows a structure of fabric panels (sheets) that form the airbag 212a; wherein (A) shows an outside back panel; (B) shows an inner back panel; and (C) shows a front panel. The main point of difference of the present example from the aforementioned first example is in a shape of the lower space that constructs the side chamber.

As shown in FIG. 10 (B), when seen as a space, the airbag 212a in a deployed state is constructed from a center chamber 214 positioned substantially in front of the occupant 14, and side chambers 216L and 116R positioned on both of the left and right sides of the center chamber 214. In FIG. 10 (A), the front chamber 214 is in a state of being almost hidden by the side chamber. The side chambers 216R and 216L are spatially a single chamber linked at the rear. Moreover, as shown in FIG. 10 (A), the side chambers 216R and 216L are provided with: a gas introduction space 202 into which inflation gas supplied from the inflator 18 is first supplied; an upper space 204 that extends diagonally upward (toward the front) from the gas introduction space 202; and a lower space 206 that extends downward from the gas introduction space 202. A direction (angle) in which the upper space 204 and the lower space 206 extend can be appropriately changed in design to suit the structure of a vehicle in which the present invention is to be applied.

The gas introduction space 202, the upper space 204, and the lower space 206 are formed (partitioned) by sewing. In the side chamber, the upper space 204 deploys from the gas introduction space 202 substantially along the windshield 22. Meanwhile, the lower space 206 has a hook shape, the tip end of which faces up, and the side of the lower space 206 that is closer to the gas introduction space 202 deploys so as to extend downward along the instrument panel 16. An area (width) of a portion that links from the gas introduction space 202 to the upper space 204 is set greater than an area (width) of a portion that links from the gas introduction space 202 to the lower space 206. As a result, the upper space 204 deploys before the lower space 206 does. A gas inlet 218 that links to the inflator 18 is formed in a rear end section of the back panel that constructs the side chambers 216R and 216L.

When seeing the airbag 212 as a panel configuration, as shown in FIG. 11, it is configured from two back panels 222B and 222F having the same shape, and a front panel 230. A band shaped front panel 230 forms an occupant side surface of the center chamber 214. The side chambers 216R and 216L are formed by sewing the outer peripheries of the two back panels 222B and 222F. Moreover, the inner back panel 222F and the center panel 230 form the center chamber 214. In FIG. 11, broken lines show the places sewed. Also, the areas shown with cross hatching in (A) and (B) are the portions that inflate as an airbag (side chamber). Inflation gas is not filled in other areas.

Sewed lines of the two back panels 222B and 222F are formed in the area of the entire circumference as well as in positions that separate the above mentioned gas introduction space 202, the upper space 204, and the lower space 206. The gas inlet 218 that links to the inflator 18 is formed substantially in the center of the back panel 222B positioned on the rear side (outside). Moreover, vent holes 224BR and 224BL for discharging the gas inside the center chamber 214 to the outside, are formed on both of the left and right sides. Vent holes 224FL and 224FR that oppose the vent holes 224BL and 224BR of the back panel 222B, are formed in the other back panel 222F on the front side (inside). The peripheries of two opposing holes are sewn so that inflation gas inside the center chamber 214 can be discharged to the outside through the side chambers 216L and 216R.

In the inner back panel 222F, inner vents 228L and 228R are formed in the vicinity of the tip ends of areas 225FL and 225FR that form the lower space 206. These inner vents 228L and 228R are formed smaller than the vent holes 224FL and 224FR. The inner vents 228L and 228R guide the inflation gas filled inside the side chambers 216L and 216R to the center chamber 214. It is preferable to appropriately change the size and formation position of the inner vent to suit the deployment timing of the lower space 206.

In the two back panels 222B and 222F that have been sewn together: an area 223BL and an area 223FL form the upper space 204 on the left side; an area 223BR and an area 213FR form the upper space 204 on the right side; an area 225BL and an area 225FL form the lower space 206 on the left side; and an area 225BR and an area 225FR form the lower space 206 on the right side. The back panel 222F on the front side (inside) and the front panel 230 form the center chamber 214. In practice, the front panel 230 is sewed to the back panel in a state of having been rotated 90 degrees to the left from the state shown in (C) in the diagram.

When manufacturing the airbag, the two back panels 222B and 222F are overlapped first, and the peripheries of the vent holes 224BR and 224FR and peripheries of the vent holes 224BL and 224FL are respectively sewn. Then, the overlapped back panels 222B and 222F are folded from the center to the inside, and the peripheries of the back panels 222B and 222F and periphery of the front panel 230 are sewn together. The peripheries of the back panels 222B and 222F may be pre-sewn before sewing them to the front panel 230.

The deployment behavior of the airbag according to the present example is substantially the same as that of the first example described above. The difference between them is that the deployment timing of the center chamber 214 is slightly slower due to the difference in the shape of the lower space 206 (difference in distance to the inner vent) of the side chamber.

In the first and second examples described above, the center chamber and the side chamber use the same single inflator. However, the center chamber and the side chamber may use different inflators. In this case, inflation gas supply to a plurality of the chambers that forms the airbag can be easily controlled, and the deployment speed of the airbag and the internal pressure of each section can be optimally set for each chamber. For example, in the case where the occupant is in unusually close proximity to the instrument panel, by lowering deployment speed of the chamber in the position corresponding to the occupant's head, and by not deploying the chamber or lowering the internal pressure thereof, the impact on the head (neck) of the occupant can be lessened. Meanwhile, when the occupant is in a normal sitting position, by deploying all of the chambers, or setting the internal pressure of the chambers higher, occupant restraining performance can be maintained at a high level. Thus, regardless of whether the occupant is in a normal sitting position or in unusually close proximity to the instrument panel, neck injuries can be reduced without reducing occupant restraining performance.

Here, the status of an occupant being in unusually close proximity to an airbag device side (instrument panel) (out of position) can be detected by a commonly known method. Moreover, the status of the occupant in a normal sitting position can also be detected by the commonly know method. Furthermore, the deployment of a plurality of chambers can be controlled according to whether or not the occupant is wearing a seat belt. In addition, the internal pressure and the operative/non-operative status of each of the chambers that form the airbag may be changed by manual setting by the occupant. For example, in the case where a child is in the front passenger seat, the center chamber may be set in an "always non-operative" state.

What is claimed is:

1. An airbag device having an airbag that is housed in a state of being able to inflate and deploy in front of an occupant, comprising:
    a center chamber;
    side chambers positioned on both the left and right sides of said center chamber; and
    a gas supply section that supplies inflation gas to inside of said side chambers, and a means for introducing inflation gas to inside of said center chamber;
    wherein said side chamber each have a gas introduction space into which inflation gas from said gas supply section is introduced, an upper space that branches from said gas introduction space and extends upward, and a lower space that branches from said gas introduction space and extends downward;
    wherein said airbag includes a front face panel that forms a surface on the occupant side of said center chamber, a first rear panel that forms an outer circumferential surface of said side chambers, and a second rear panel having an outer shape substantially the same as that of said first rear panel;
    wherein each of said side chambers is formed by joining outer circumferences of said first rear panel and said second rear panel, and said center chamber is formed by said second rear panel and said front face panel.

2. An airbag device according to claim 1, wherein said gas introduction space, said upper space, and said lower space of said side chambers are formed by sewing.

3. An airbag device according to claim 1, wherein
    said upper space of each of said side chambers deploys substantially along a windshield, and
    said lower space of each of said side chambers deploys substantially along an instrument panel.

4. An airbag device according to claim 1, wherein
    the lower space of said side chambers has an additional area in an end section on an opposite side of said gas introduction space, the additional area being formed to be a hook shape with an end extending upwardly.

5. An airbag device according to claim 1, wherein
    said means for supplying inflation gas to inside of said center chamber is an aperture section that links from said side chambers to said center chamber.

6. An airbag device according to claim 5, wherein
    said aperture section is formed in said lower space of said side chambers.

7. An airbag device according to claim 6, wherein
    said aperture section is formed in the vicinity of an end portion farthest from said gas introduction space in said lower space.

8. An airbag device according to claim 1, wherein
    in each said side chamber, an area of a gas passage from said gas introduction space to said upper space is greater than an area of a gas passage from said gas introduction space to said lower space.

9. An airbag device comprising:
    first and second side chambers;
    a center chamber disposed between the first and second side chambers;
    a front face panel that forms a surface on an occupant side of the center chamber;
    a first rear panel that forms an outer circumferential surface of the side chamber;
    a second rear panel having an outer shape substantially the same as that of the first rear panel, the side chambers formed by joining outer circumferences of the first rear panel and the second rear panel, and the center chamber formed by the second rear panel and the front face panel; and
    a gas supply section that supplies inflation gas to the first and second side chambers, and for introducing inflation gas to the center chamber;
    wherein each of the side chambers has a gas introduction space into which inflation gas from the gas supply section is introduced, an upper space that branches from the gas introduction space and extends upward, and a lower space that branches from the gas introduction space and extends downward.

10. An airbag comprising:
    a first rear panel having a first outer periphery;
    a second rear panel having a second outer periphery, the second outer periphery sewn to the first outer periphery to define first and second side chambers;
    a front panel cooperating with the second rear panel to define a center chamber between the first and second side chambers; and an inflator in fluid communication with the first and second side chambers for delivering an inflation gas thereto;

wherein the center chamber receives the inflation gas from the first and second side chambers.

11. The airbag of claim 10, wherein each side chamber has a gas introduction space into which the inflation gas is introduced, an upper space that branches from the gas introduction space and extends upward, and a lower space that branches from the introduction space and extends downward.

12. The airbag of claim 10, wherein the second rear panel has an outer shape substantially the same as the first rear panel.

13. The airbag of claim 11, wherein the gas introduction space, the upper space and the lower space are formed by sewing.

14. The airbag of claim 10, wherein an aperture section provides fluid communication between the first and second side chambers and the center chamber.

15. The airbag of claim 14, wherein the aperture section is formed in the lower portion of the side chambers.

16. The airbag of claim 15, wherein the aperture section is formed proximate an end portion farthest from the gas introduction space in the lower space.

17. The airbag of claim 10, wherein each side chamber includes a gas passage from the gas introduction space to the upper space having an area greater than an area of a gas passage from the gas introduction space to the lower space.

* * * * *